(12) United States Patent
Palmer et al.

(10) Patent No.: US 9,663,118 B1
(45) Date of Patent: May 30, 2017

(54) AUTONOMOUS VEHICLE OPERATOR PERFORMANCE TRACKING

(71) Applicant: SMARTDRIVE SYSTEMS, INC., San Diego, CA (US)

(72) Inventors: Jason Palmer, Carlsbad, CA (US); Mark Freitas, San Diego, CA (US); Daniel A. Deninger, Carlsbad, CA (US); David Forney, La Jolla, CA (US); Slaven Sljivar, San Diego, CA (US); Alekh Vaidya, San Diego, CA (US); Jeffrey Griswold, San Diego, CA (US)

(73) Assignee: SmartDrive Systems, Inc., San Diego, CA (US)

( * ) Notice: Subject to any disclaimer, the term of this patent is extended or adjusted under 35 U.S.C. 154(b) by 0 days.

(21) Appl. No.: 15/341,737

(22) Filed: Nov. 2, 2016

(51) Int. Cl.
*B60W 50/12* (2012.01)
*B60W 50/08* (2012.01)
*G05D 1/00* (2006.01)

(52) U.S. Cl.
CPC .......... *B60W 50/12* (2013.01); *B60W 50/082* (2013.01); *G05D 1/0061* (2013.01); *G05D 1/0088* (2013.01); *B60W 2540/22* (2013.01); *B60W 2550/12* (2013.01); *B60W 2550/20* (2013.01)

(58) Field of Classification Search
None
See application file for complete search history.

(56) References Cited

U.S. PATENT DOCUMENTS

| | | | |
|---|---|---|---|
| 7,894,951 B2* | 2/2011 | Norris | H04L 67/12 180/443 |
| 2006/0220883 A1* | 10/2006 | Matos | A62B 99/00 340/573.1 |
| 2011/0241862 A1* | 10/2011 | Debouk | B60W 50/035 340/439 |
| 2013/0131907 A1* | 5/2013 | Green | G05D 1/0055 701/23 |
| 2014/0156133 A1* | 6/2014 | Cullinane | B60W 30/00 701/23 |
| 2014/0375462 A1* | 12/2014 | Biondo | A61B 5/18 340/576 |
| 2015/0066282 A1* | 3/2015 | Yopp | G05D 1/0061 701/24 |
| 2015/0066284 A1* | 3/2015 | Yopp | B60W 30/00 701/29.2 |
| 2015/0149021 A1* | 5/2015 | Duncan | A61B 5/18 701/23 |
| 2016/0140872 A1* | 5/2016 | Palmer | G06K 9/00791 434/65 |
| 2016/0280234 A1* | 9/2016 | Reilhac | B60K 35/00 |
| 2017/0021837 A1* | 1/2017 | Ebina | B60K 28/06 |

* cited by examiner

*Primary Examiner* — Jonathan M Dager
(74) *Attorney, Agent, or Firm* — Sheppard Mullin Richter & Hampton LLP

(57) ABSTRACT

This disclosure relates to a system and method for determining vehicle operator preparedness for vehicles that support both autonomous operation and manual operation. The system includes sensors configured to generate output signals conveying information related to vehicles and their operation. During autonomous vehicle operation, the system gauges the level of responsiveness of an individual vehicle operator through challenges and corresponding responses. Based on the level of responsiveness, a preparedness metric is determined for each vehicle operator individually.

18 Claims, 4 Drawing Sheets

AUTONOMOUS VEHICLE OPERATOR PERFORMANCE TRACKING

FIELD

The systems and methods disclosed herein are related to vehicle operators of vehicles that support both autonomous operation and manual operation, and, in particular, determining a level of preparedness for the vehicle operators.

BACKGROUND

Systems configured to record, store, and transmit video, audio, and sensor data associated with a vehicle are known. Autopilots for vehicles are known. Typically, an autonomous operation mode of vehicle control may be entered or exited under certain specific and/or pre-determined parameters. Some vehicles may interface/interoperate with external computers (e.g., at an automobile mechanic) where information that is relevant to vehicle operation and/or vehicle operators may be generated and/or processed.

SUMMARY

One aspect of the disclosure relates to a system configured to determine vehicle operator preparedness for vehicles that support both autonomous operation and manual operation. The system may be coupled and/or otherwise related to a vehicle. Some or all of the system may be installed in the vehicle and/or be otherwise coupled with the vehicle. The system may be configured to capture information based on vehicle operation. The system may be configured to off-load and/or otherwise transmit captured information, e.g. to a device remote and/or external to the vehicle. Vehicles configured to operate in an autonomous operation mode may be referred to as "self-driving" vehicles.

In some implementations, the system may include sensors, one or more servers, one or more physical processors, electronic storage, one or more external providers, and/or other components. The sensors may be configured to generate output signals conveying information related to the operation of the vehicle, the vehicle operator, driving parameters, and/or other relevant information. The system may determine, gauge, measure, calculate, compute, estimate, approximate, generate, and/or otherwise derive vehicle operator preparedness, e.g., based on a combination of different types of information. In some implementations, preparedness may indicate whether a vehicle operator is ready or prepared to assume control of a vehicle. In some implementations, the system may control vehicle operation based on a level of confidence in the vehicle operator and/or the autopilot to handle current driving parameters.

In some implementations, the system may detect vehicle events based on a comparison of the information conveyed by the output signals from the sensors to predetermined (variable and/or fixed) values, threshold, functions, and/or other information. Advantageously, the system may identify vehicle events in real-time or near real-time during operation of the vehicle. As used herein, the term "processor" is used interchangeably with the term "physical processor."

Individual sensors may be configured to generate output signals conveying information. The information may include visual information, motion-related information, position-related information, biometric information, and/or other information. In some implementations, the system may determine one or more parameters that are measured, derived, estimated, approximated, and/or otherwise determined based on one or more output signals generated by one or more sensors.

Sensors may include, by way of non-limiting example, one or more of an altimeter (e.g. a sonic altimeter, a radar altimeter, and/or other types of altimeters), a barometer, a magnetometer, a pressure sensor (e.g. a static pressure sensor, a dynamic pressure sensor, a pitot sensor, etc.), a thermometer, an accelerometer, a gyroscope, an inertial measurement sensor, global positioning system sensors, a tilt sensor, a motion sensor, a vibration sensor, an image sensor, a camera, an ultrasonic sensor, an infrared sensor, a light sensor, a microphone, an air speed sensor, a ground speed sensor, an altitude sensor, biometric sensors (including but not limited to blood pressure sensor, pulse oximeter, heart rate sensor, Blood Alcohol Concentration (BAC) sensor, etc.), degree-of-freedom sensors (e.g. 6-DOF and/or 9-DOF sensors), seat pressure sensor, a compass, and/or other sensors. As used herein, the term "motion sensor" may include one or more sensors configured to generate output conveying information related to position, location, distance, motion, movement, acceleration, and/or other motion-based parameters. Output signals generated by individual sensors (and/or information based thereon) may be stored and/or transferred in electronic files.

Individual sensors may include image sensors, cameras, depth sensors, remote sensors, and/or other sensors. As used herein, the terms "camera" and/or "image sensor" may include any device that captures images, including but not limited to a single lens-based camera, a camera array, a solid-state camera, a mechanical camera, a digital camera, an image sensor, a depth sensor, a remote sensor, a lidar, an infrared sensor, a (monochrome) complementary metal-oxide-semiconductor (CMOS) sensor, an active pixel sensor, and/or other sensors. Individual sensors may be configured to capture information, including but not limited to visual information, video information, audio information, geolocation information, orientation and/or motion information, depth information, and/or other information. Information captured by one or more sensors may be marked, time-stamped, annotated, and/or otherwise processed such that information captured by other sensors can be synchronized, aligned, annotated, and/or otherwise associated therewith. For example, video information captured by an image sensor may be synchronized with information captured by an accelerometer or other sensor. Output signals generated by individual image sensors (and/or information based thereon) may be stored and/or transferred in electronic files.

In some implementations, an image sensor may be integrated with electronic storage such that captured information may be stored in the integrated embedded storage. In some implementations, the system may include one or more cameras. For example, a camera may include one or more image sensors and electronic storage media. In some implementations, an image sensor may be configured to transfer captured information to remote electronic storage media, e.g. through "the cloud."

The one or more servers may include one or more processors configured to execute one or more computer program components. The computer program components may include one or more of a parameter determination component, an autopilot component, a timing component, a challenge component, a response component, a responsiveness component, a vehicle control component, a confidence component, a record component, a transmission component, a preparedness component, a performance component, a comparison component, and/or other components.

The parameter determination component may be configured to determine parameters, e.g. based on output signals from sensors. Parameters may include operating parameters, driving parameters, traffic parameters, road surface parameters, weather parameters, vehicle parameters, operator parameters, environmental parameters, and/or other parameters. The different types of parameters used in this disclosure need not be mutually exclusive. For example, a parameter representing the current level of precipitation may be both a weather parameter and an environmental parameter. For example, a parameter representing how icy the road is may be both a road surface parameter and an environmental parameter. By way of non-limiting example, other relationships between different types of parameters are described in this disclosure.

Current operating parameters may be related to the vehicle, the operation of the vehicle, physical characteristics of the vehicle, and/or other information. Driving parameters may be related to traffic parameters, road surface parameters, weather parameters, and/or other information. Vehicle parameters may be related to the vehicle, the operation of the vehicle, physical characteristics of the vehicle, and/or other information. Operator parameters may be related to the vehicle operator, and/or other information. Environmental parameters may be related to the environment outside of the vehicle, visibility, and/or other information.

In some implementations, the parameter determination component may be configured to determine a parameter one or more times in an ongoing manner during operation of the vehicle, and/or over periods longer than one day, one week, and/or one month. In some implementations, one or more parameters (e.g. weather parameters) may be received from one or more sources external to the vehicle. For example, a source external to the vehicle may include a remote server and/or an external provider.

The autopilot component may be configured to operate a vehicle autonomously, e.g. in an autonomous operation mode. As used herein, the term "autonomous" refers to a lack of human intervention or control, at least for some continuous duration. In some implementations, the autopilot component may be configured to determine whether vehicle control shall be transitioned from an autonomous operation mode to a manual operation mode. In some implementations, the autopilot component may be configured to transition vehicle control between different modes of operation, e.g. from an autonomous operation mode to a manual operation mode. In some implementations, operations of the autopilot component may be based on the operations of the vehicle control component, and/or vice versa.

The timing component may be configured to determine moments in time for gauging whether a vehicle operator is ready to assume control of a vehicle. A vehicle operator being ready to assume manual control may be referred to as being prepared or preparedness. In some implementations, the timing component may be configured to determine a moment in time to present a challenge to the vehicle operator. Once a challenge has been presented, the vehicle operator may take action to respond to or meet the challenge. The challenge and response may be used to gauge a level of responsiveness of the vehicle operator. In some implementations, preparedness may correspond to responsiveness of the vehicle operator. For example, a highly responsive vehicle operator may be deemed highly prepared to assume manual control of the vehicle. On the other hand, a vehicle operator who is slow to respond to a challenge may be deemed unprepared or insufficiently prepared to assume manual control of the vehicle.

The challenge component may be configured to present challenges to vehicle operators. In some implementations, the challenge component may be configured to present a challenge to a vehicle operator at a moment in time as determined by the timing component. For example, a challenge may include generation of a sound, activation of an indicator, and/or another audible and/or visual notification to which a vehicle operator is expected to respond, in order to confirm he or she is paying attention in general, and, more specifically, ready to assume manual control of the vehicle if needed.

The response component may be configured to detect whether a vehicle operator has responded to a challenge presented by the challenge component. In some implementations, a response may include audible feedback (i.e. the vehicle operator may say a particular phrase out loud such that his or her response may be captured through a microphone), tactile feedback, a particular gesture or motion, a particular interaction with a user interface (i.e. the vehicle operator may push a button or swipe across a touchscreen to indicate a response), and/or other types of responses capable of being interpreted and/or recognized through one or more sensors of the vehicle.

The responsiveness component may be configured to determine levels of responsiveness of a vehicle operator. In some implementations, determinations by the responsiveness component may be based on detections by the response component. Alternatively, and/or simultaneously, determinations by the responsiveness component may be based on (the timing of) presentations by the challenge component. For example, a level of responsiveness may be based on the elapsed time between a presentation of a challenge and detection of a response to that challenge by the vehicle operator.

The vehicle control component may be configured to operate the vehicle in one or more modes of operation. In some implementations, the vehicle control component may be configured to transition vehicle control between different modes of operation. For example, the vehicle control component may transition vehicle control from an autonomous mode of operation to a manual mode of operation, and/or vice versa. For example, the vehicle control component may transition vehicle control from an autonomous mode of operation to halt vehicle operation, e.g. by pulling the vehicle over or parking the vehicle. In some implementations, operations and/or transitions by the vehicle control component may be based on determinations by the responsiveness component, and/or based on the operation of other components. In some implementations, operations of the autopilot component may be based on the operations of the vehicle control component, and/or vice versa.

The confidence component may be configured to determine levels of confidence pertaining to one or more modes of vehicle operation. In some implementations, the confidence component may be configured to determine an operator confidence. Operator confidence may be a level of confidence that the vehicle operator is prepared to assume manual control of the vehicle. In some implementations, the confidence component may be configured to determine an automation confidence. Automation confidence may be a level of confidence that vehicle control through an autonomous mode of operation is prepared to continue autonomous vehicle operation. One or more levels of confidence may be used by other components, e.g. by the timing component.

The record component may be configured to capture, record, store, and/or transmit information, including but not limited to information related to vehicle operation. In some implementations, information related to vehicle operation may be used to create vehicle event records. For example, changes in the operation mode of the vehicle may be used to create a vehicle event record. For example, determinations by the responsiveness component may be used to create a vehicle record. For example, determinations by other components may be used to create a vehicle record. Vehicle event records may include video information, audio information, data from an engine control module (ECM) system, metadata, information based on sensor-generated output, and/or other information.

The transmission component may be configured to transmit information, e.g. to one or more remote servers that are external to a vehicle. For example, the transmission component may be configured to transmit vehicle event records. Vehicle event records may be stored locally in a vehicle and/or transmitted from a vehicle to a system, server, and/or a service that is external to the vehicle, including but not limited to a remote server and/or an external provider. In some implementations, a system, server, and/or a service that is external to the vehicle may query and/or request information from a particular vehicle. The transmission component may be configured to respond to a query or request by transmitting information as queried and/or requested. In some implementations, the transmission component may be configured to facilitate communication of information between vehicles, remote servers, external providers, and/or other systems, servers, and/or services external to vehicles. Communication may be in real-time or near real-time. Communication may be wireless.

The transmission component may be configured to generate and/or determine notifications related to vehicle operation. In some implementations, notifications may be intended for drivers of vehicles. For example, the transmission component may be configured to receive transmission, such as notifications for drivers, including but not limited to warnings or requests (for example to reduce speed). In some implementations, notifications may be transmitted from a vehicle to a system, server, and/or a service that is external to the vehicle, including but not limited to a remote server and/or an external provider.

The preparedness component may be configured to determine preparedness of vehicle operators. In some implementations, preparedness may indicate whether a vehicle operator is ready or prepared to assume control of a vehicle. In some implementations, preparedness may indicate whether a vehicle operator is ready or prepared to assume control of a vehicle that is currently controlled autonomously and/or by another person. In some implementations, preparedness may be represented by a metric, a level, a numeric value, and/or other representation. In some implementations, preparedness may be determined per individual vehicle operator. In some implementations, preparedness may be based on a level of responsiveness, e.g. as determined by the responsiveness component. In some implementations, preparedness may be determined based on at least two responses by an individual vehicle operator to presented challenges. In some implementations, preparedness may be determined based on at least three responses by an individual vehicle operator to presented challenges. In some implementations, preparedness may be determined based on more than three responses by an individual vehicle operator to presented challenges.

The performance component may be configured to determine driving performance of vehicle operators. In some implementations, driving performance may include a duration during and/or after a transition between operation modes. For example, driving performance may include a duration during and/or after a transition from an autonomous operation mode to a manual operation mode.

The comparison component may be configured to compare preparedness of individual vehicle operators over time. In some implementations, the comparison component may be configured to compare preparedness of more than one vehicle operator. In some implementations, the comparison component may be configured to compare preparedness of a set of vehicle operators. For example, a set of vehicle operators may be selected and/or filtered on one or more characteristics they have in common, such as geographical location, a demographic characteristic, and/or other information.

As used herein, any association (or relation, or reflection, or indication, or correspondency) involving vehicles, sensors, vehicle events, challenges, responses, parameters, thresholds, levels, metrics, functions, notifications, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect. As used herein, the term "determine" (and derivatives thereof) may include gauge, measure, calculate, compute, estimate, approximate, generate, and/or otherwise derive, and/or any combination thereof.

These and other objects, features, and characteristics of the servers, systems, and/or methods disclosed herein, as well as the methods of operation and functions of the related elements of structure and the combination of parts and economies of manufacture, will become more apparent upon consideration of the following description and the appended claims with reference to the accompanying drawings, all of which form a part of this disclosure, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
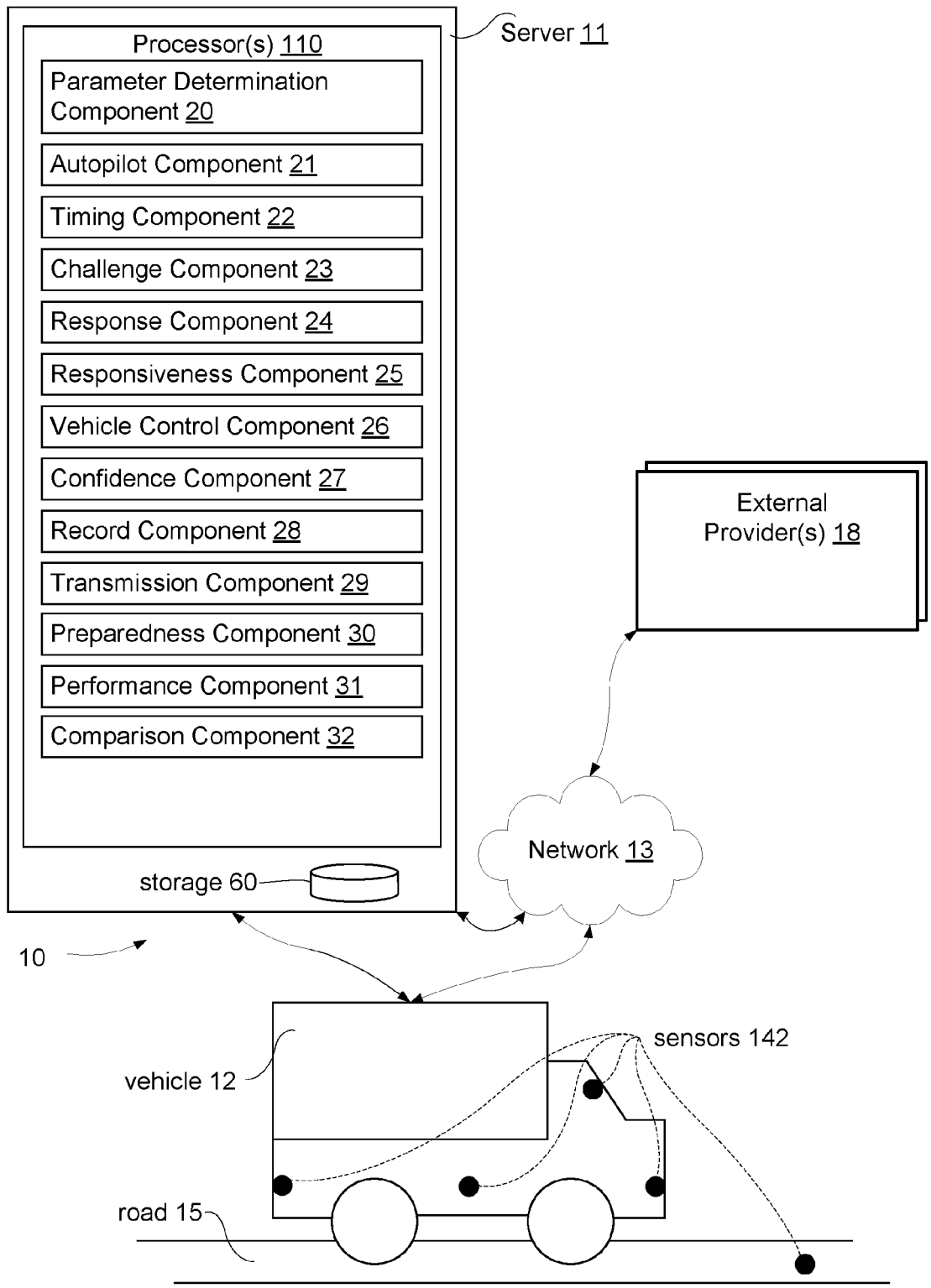
FIG. 1 illustrates a system configured to determine vehicle operator preparedness for vehicle operators of vehicles that support both autonomous operation and manual operation, in accordance with one or more embodiments.

FIG. 1 illustrates a system 10 configured to determine vehicle operator preparedness for a vehicle operator of a vehicle 12 that supports both autonomous operation and manual operation. In some implementations, system 10 may be configured to determine vehicle operator preparedness for a set of vehicle operators. Some or all of system 10 may be installed in vehicle 12, carried by vehicle 12, and/or be otherwise coupled with and/or related to vehicle 12. In some implementations, system 10 may include sensors 142, one or more servers 11, one or more physical processors 110, electronic storage 60, a network 13, one or more external providers 18, and/or other components. One or more sensors 142 may be configured to generate output signals. The output signals may convey information related to vehicle 12, vehicle operation of vehicle 12, a vehicle operator of vehicle 12, operating parameters of vehicle 12, parameters of vehicle 12, and/or other parameters.

Information related to current operating parameters of the vehicle may include feedback information from one or more of the mechanical systems of vehicle 12, and/or other information. The mechanical systems of vehicle 12 may include, for example, the engine, the drive train, the lighting systems (e.g., headlights, brake lights), the braking system, the transmission, fuel delivery systems, and/or other mechanical systems. The mechanical systems of vehicle 12 may include one or more mechanical sensors, electronic sensors, and/or other sensors that generate the output signals (e.g., seat belt sensors, tire pressure sensors, etc.). In some implementations, at least one of sensors 142 may be a vehicle system sensor included in an ECM system of vehicle 12.

In some implementations, sensors 142 may include one or more video cameras, one or more image sensors, and/or one or more microphones, and/or other sensors. Based on an analysis of images and/or sounds captured, system 10 may determine, using algorithms, that vehicle 12 is moving forward, is in reverse, has maneuvered outside of its lane of traffic, is making a turn, and/or other maneuvers. For example, by way of non-limiting example, driving maneuvers may include swerving, a U-turn, freewheeling, over-revving, lane-departure, short following distance, imminent collision, unsafe turning that approaches rollover and/or vehicle stability limits, hard braking, rapid acceleration, idling, driving outside a geo-fence boundary, crossing double-yellow lines, passing on single-lane roads, a certain number of lane changes within a certain amount of time or distance, fast lane change, cutting off other vehicles during lane-change speeding, running a red light, running a stop sign, and/or other driving maneuvers.

In some implementations, information related to current operating parameters of vehicle 12 may include information related to the environment in and/or around vehicle 12. The vehicle environment may include spaces in and around an interior and an exterior of vehicle 12. The information may include information related to movement of vehicle 12, an orientation of vehicle 12, a geographic position of vehicle 12, a spatial position of vehicle 12 relative to other objects, a tilt angle of vehicle 12, an inclination/declination angle of vehicle 12, and/or other information. In some implementations, the output signals conveying information may be generated via non-standard aftermarket sensors installed in vehicle 12. Non-standard aftermarket sensors may include, for example, a video camera, a microphone, an accelerometer, a gyroscope, a geolocation sensor (e.g., a GPS device), a radar detector, a magnetometer, radar (e.g. for measuring distance of leading vehicle), and/or other sensors. In some implementations, sensors 142 may include multiple cameras positioned around vehicle 12 and synchronized together to provide a 360 degree view of the inside of vehicle 12 and/or a 360 degree view of the outside of vehicle 12.

Although sensors 142 are depicted in FIG. 1 as a particular number of elements, e.g. five elements, this is not intended to be limiting. Sensors 142 may include one or more sensors located adjacent to and/or in communication with the various mechanical systems of vehicle 12, in one or more positions (e.g., at or near the front of vehicle 12, at or near the back of vehicle 12, on the side of vehicle 12, on or near the windshield of vehicle 12, facing outward and/or inward, etc.) to accurately acquire information representing the vehicle environment (e.g. visual information, spatial information, orientation information), and/or in other locations. For example, in some implementations, system 10 may be configured such that a first sensor is located near or in communication with a rotating tire of vehicle 12, and a second sensor located on top of vehicle 12 is in communication with a geolocation satellite. In some implementations, sensors 142 may be configured to generate output signals continuously during operation of vehicle 12. In some implementations, one or more sensors 142 may be located external to vehicle 12, e.g., as depicted in FIG. 1, in proximity of a road 15. Sensors external to vehicle 12 may be configured to generate output signals that convey information that is external to vehicle 12 but pertinent to vehicle operation, including but not limited to traffic information, visibility information, road surface information, and/or other information.

As shown in FIG. 1, server 11 may include one or more processors 110 configured to execute one or more computer program components. System 10 may determine, gauge, measure, calculate, compute, estimate, approximate, generate, and/or otherwise derive whether a vehicle operator is ready or prepared to assume control of vehicle 12, based on a combination of different types of information. In some implementations, system 10 may control vehicle operation based on a level of confidence in the vehicle operator and/or the autopilot to handle current driving parameters. The computer program components may comprise one or more of a parameter determination component 20, an autopilot component 21, a timing component 22, a challenge component 23, a response component 24, a responsiveness component 25, a vehicle control component 26, a confidence component 27, a record component 28, a transmission component 29, a preparedness component 30, a performance component 31, a comparison component 32, and/or other components.

Parameter determination component 20 may be configured to determine parameters, e.g. current operating parameters and/or vehicle parameters of vehicle 12. Parameter determination component 20 may determine current operating parameters, driving parameters, traffic parameters, road surface parameters, weather parameters, vehicle parameters, operator parameters, environmental parameters, and/or other parameters based on the information conveyed by the output signals from sensors 142 and/or other information. The one or more current operating parameters may be related to vehicle 12, the operation of vehicle 12, physical characteristics of vehicle 12, and/or other information. Driving parameters may be related to traffic parameters, road surface parameters, weather parameters, and/or other information. Vehicle parameters may be related to vehicle 12, the operation of vehicle 12, physical characteristics of vehicle 12, and/or other information. Operator parameters may be related to the vehicle operator, and/or other information. Environmental parameters may be related to the environment outside of vehicle 12, visibility for the vehicle operator, and/or other information. In some implementations, parameter determination component 20 may be configured to determine one or more of the current operating parameters and/or the vehicle parameters one or more times in an ongoing manner during operation of vehicle 12.

In some implementations, operating parameters may include vehicle parameters. For example, vehicle parameters may be related to one or more of an acceleration, a direction of travel, a turn diameter, a vehicle speed, an engine speed (e.g. RPM), a duration of time, a closing distance, a lane departure from an intended travelling lane of the vehicle, a following distance, physical characteristics of vehicle 12 (such as mass and/or number of axles, for example), a tilt angle of vehicle 12, an inclination/declination angle of vehicle 12, and/or other parameters.

The physical characteristics of vehicle 12 may be physical features of vehicle 12 set during manufacture of vehicle 12, during loading of vehicle 12, and/or at other times. For example, the one or more vehicle parameters may include a vehicle type (e.g., a car, a bus, a semi-truck, a tanker truck), a vehicle size (e.g., length), a vehicle weight (e.g., including cargo and/or without cargo), a number of gears, a number of axles, a type of load carried by vehicle 12 (e.g., food items, livestock, construction materials, hazardous materials, an oversized load, a liquid), vehicle trailer type, trailer length, trailer weight, trailer height, a number of axles, and/or other physical features.

Traffic parameters may be related to the number of other vehicles on the road, the distance to one or more other vehicles, the average distance to a vehicle in front of vehicle 12, average speed of vehicle 12, and/or other parameters that vary with traffic conditions. Road surface parameters may be related to the material that comprises the road, the inclination of the road, the width of the road, the curviness of the road, the wetness of the road, the iciness of the road, and/or other parameters related to road surface. Weather parameters may be related to temperature, humidity, precipitation, wind speed and direction, storminess, visibility, ambient lighting conditions, and/or other parameters related to weather. Operator parameters may be related to the height, weight, reaction time, dexterity, driving record, reaction time, eyesight, hearing, and/or other measurements or physical characteristics of the vehicle operator. Operator parameters may be related to biometric information of the vehicle operator, including but not limited to heart rate, breathing rate, blood pressure level, and/or other biometric information. Operator parameters may be related to the current position or location of the vehicle operator, the direction of the vehicle operator's face, eyes, or gaze, and/or other operator information. Environmental parameters may be related to the environment outside of the vehicle, visibility, and/or other information.

In some implementations, parameter determination component 20 may be configured to determine one or more vehicle parameters based on the output signals from at least two different sensors. For example, parameter determination component 20 may determine one or more of the vehicle parameters based on output signals from a sensor 142 related to the ECM system and an external aftermarket added sensor 142. In some implementations, a determination of one or more of the vehicle parameters based on output signals from at least two different sensors 142 may be more accurate and/or precise than a determination based on the output signals from only one sensor 142. For example, on an icy surface, output signals from an accelerometer may not convey that a driver of vehicle 12 is applying the brakes of vehicle 12. However, a sensor in communication with the braking system of vehicle 12 would convey that the driver is applying the brakes. System 10 may determine a value of a braking parameter based on the braking sensor information even though the output signals from the accelerometer may not convey that the driver is applying the brakes.

Parameter determination component 20 may be configured to determine vehicle parameters that are not directly measurable by any of the available sensors. For example, an inclinometer may not be available to measure the road grade, but vehicle speed data as measured by a GPS system and/or by a wheel sensor ECM may be combined with accelerometer data to determine the road grade. If an accelerometer measures a force that is consistent with braking, but the vehicle speed remains constant, the parameter component can determine that the measured force is a component of the gravity vector that is acting along the longitudinal axis of the vehicle. By using trigonometry, the magnitude of the gravity vector component can be used to determine the road grade (e.g., pitch angle of the vehicle in respect to the horizontal plane).

In some implementations, one or more of the vehicle parameters may be determined one or more times in an ongoing manner during operation of vehicle 12. In some implementations, one or more of the vehicle parameters may be determined at regular time intervals during operation of vehicle 12. The timing of the vehicle parameter determinations (e.g., in an ongoing manner, at regular time intervals, etc.) may be programmed at manufacture, obtained responsive to user entry and/or selection of timing information via a user interface and/or a remote computing device, and/or may be determined in other ways. The time intervals of parameter determination may be significantly less (e.g. more frequent) than the time intervals at which various sensor measurements are available. In such cases, system 10 may estimate vehicle parameters in between the actual measurements of the same vehicle parameters by the respective sensors, to the extent that the vehicle parameters are measurable. This may be established by means of a physical model that describes the behavior of various vehicle parameters and their interdependency. For example, a vehicle speed parameter may be estimated at a rate of 20 times per second, although the underlying speed measurements are much less frequent (e.g., four times per second for ECM speed, one time per second for GPS speed). This may be accomplished by integrating vehicle acceleration, as measured by the accelerometer sensor where the measurements are available 1000 times per second, across time to determine change in speed that is accumulated over time again for the most recent vehicle speed measurement. The benefit of these more frequent estimates of vehicle parameters may be many and they include improved operation of other components of system 10, reduced complexity of downstream logic and system design (e.g., all vehicle parameters are updated at the same interval, rather than being updating irregularly and at the interval of each respective sensor), and more pleasing (e.g., "smooth") presentation of vehicle event recorder data through an event player apparatus.

In some implementations, one or more types of information may be received by system 10 through network 13, e.g. the internet. Network 13 may include private networks, public networks, and/or combinations thereof. For example, information related to weather parameters may be received from a particular external provider 18 that provides weather information. For example, information related to road surface parameters may be received from a particular external provider 18 that provides road parameter information. For example, information related to traffic parameters may be received from a particular external provider 18 that provides traffic information.

In some implementations, a value of a current operating parameter that effectuates a particular determination and/or detection may vary as a function of a parameter or of other information.

Autopilot component 21 may be configured to operate vehicle 12 autonomously, e.g. in an autonomous operation mode. In some implementations, system 10 may support a single autonomous operation mode. In some implementations, system 10 may support multiple autonomous operation modes. For example, a vehicle operator may be able to select which mode of operation is preferred. In some implementations, autonomous operation may be based on a particular operator-specific destination, such as a destination address, or the nearest coffee shop. Autopilot component 21 may be configured to use output signals from sensors and/or parameters derived therefrom in order to operate vehicle 12 autonomously. In some implementations, autopilot component 21 may be configured to transition vehicle control between different modes of operation, e.g. from an autonomous operation mode to a manual operation mode. In some implementations, operations of autopilot component 21 may be based on the operations of vehicle control component 26, and/or vice versa.

Timing component 22 may be configured to determine moments in time for gauging whether a vehicle operator is ready to assume control of vehicle 12. In some implementations, timing component 22 may be configured to determine a moment in time to present a challenge to the vehicle operator. Once a challenge has been presented, the vehicle operator may take action to respond to or meet the challenge. The challenge and response may be used to gauge a level of responsiveness of the vehicle operator. In some implementations, preparedness may correspond to responsiveness of the vehicle operator. In some implementations, preparedness may correspond to an estimate for how long it would take the vehicle operator to assume manual control of vehicle 12.

In some implementations, determinations by timing component 22 may be based on one or more operator parameters, driving parameters, and/or other parameters, as well as combinations thereof. In some implementations, determinations by timing component 22 may be based on one or more of biometric information of the vehicle operator, and operator information related to a direction of view of the vehicle operator. In some implementations, determinations by timing component 22 may be based on traffic information related to current traffic parameters and environmental information related to surface parameters of the road. In some implementations, determinations by timing component 22 may be based on one or more of biometric information of the vehicle operator, operator information related to a direction of view of the vehicle operator, traffic information related to current traffic parameters, and environmental information related to surface parameters of the road. In some implementations, determinations by timing component 22 may be based on one or more determination by other modules, such as a determination of a level of responsiveness of the vehicle operator by responsiveness component 25.

Challenge component 23 may be configured to present challenges to vehicle operators. In some implementations, challenge component 23 may be configured to present a challenge to a vehicle operator at a moment in time as determined by timing component 22. For example, a challenge may include generation of a sound, activation of an indicator, and/or another audible and/or visual notification to which a vehicle operator is expected to respond, in order to confirm he or she is paying attention in general, and, more specifically, ready to assume manual control of vehicle 12 if needed.

In some implementations, the output signals may convey biometric information of the vehicle operator, and a determination of timing component 22 may be based on the biometric information. For example, operator drowsiness may prompt more challenges. In some implementations, the output signals may convey operator information related to a direction of view of the vehicle operator, and a determination of timing component 22 may be based on the operator information. For example, distractedness by the operator may prompt more challenges. In some implementations, the output signals may convey traffic information related to current traffic parameters, and a determination of timing component 22 may be based on the traffic information. For example, crowded streets may warrant more challenges. In some implementations, the output signals may convey environmental information related to surface parameters of the road, and a determination of timing component 22 may be based on the environmental information. For example, wet, icy, and/or uneven roads may prompt more challenges.

Response component 24 may be configured to detect whether a vehicle operator has responded to a challenge presented by challenge component 23. In some implementations, a response may include audible feedback (i.e. the vehicle operator may say a particular phrase out loud such that his or her response may be captured through a microphone), tactile feedback, a particular gesture or motion, a particular interaction with a user interface (i.e. the vehicle operator may push a button or swipe across a touchscreen to indicate a response), and/or other types of responses capable of being interpreted and/or recognized through one or more sensors 142 of vehicle 12.

Responsiveness component 25 may be configured to determine levels of responsiveness of a vehicle operator. In some implementations, determinations by responsiveness component 25 may be used to determine whether the current mode of operation should be maintained or be changed, e.g. from autonomous to manual operation. In some implementations, determinations by responsiveness component 25 may be based on detections by response component 24. Alternatively, and/or simultaneously, determinations by responsiveness component 25 may be based on (the timing of) presentations by challenge component 23. For example, a level of responsiveness may be based on the elapsed time between a presentation of a challenge and detection of a response to that challenge by the vehicle operator. In some implementations, the elapsed time may be used as an estimate for how long it would take the vehicle operator to assume manual control of vehicle 12. In some implementations, a level of responsiveness may be based on actual responsiveness of a vehicle operator, e.g. during manual operation. In some implementations, a level of responsiveness may be based on actual responsiveness of a vehicle operator, e.g. during and/or after a transition from autonomous to manual operation. In some implementations, actual responsiveness may be based on current driving parameters, including but not limited to parameters related to riskiness.

In some implementations, operation of responsiveness component 25 may be based on comparisons with one or more thresholds. For example, the level of responsiveness of the vehicle operator may be compared with a threshold of adequate responsiveness. For example, if the threshold is met, system 10 may maintain an autonomous mode of operation. For example, if the threshold is not met, system 10 may transition to another mode of operation and/or halt or park vehicle 12. Alternatively, and/or simultaneously, if the threshold is not met, system 10 may be configured to present additional and/or different challenges that may be used to determine whether the current mode of operation should change or stay the same. In some implementations, the threshold may be adjusted dynamically. For example, under more challenging driving conditions, the required level of responsiveness may be higher than compared to less challenging driving conditions. For example, the current level of responsiveness may be used to determine the next moment in time for presenting a challenge and/or the next threshold of adequate responsiveness that the vehicle operator is required to meet in order to maintain the autonomous operation mode.

In some implementations, a value of a threshold level may vary as a function of one or more of responsiveness, a parameter, and of other information. For example, a threshold level may increase after one or more challenges. A vehicle operator may be expected to have an increased level of preparedness after one or more challenges have been presented, in particular if some of those challenges were prompted by conditions indicating a reduction in operator confidence.

In some implementations, the required level of responsiveness may be adjusted based on measurements and/or determinations spanning a period extending beyond 15 minutes, or an hour, or spanning a day, week, month, year, or more. For example, adjustments may be based on a particular vehicle operator's driving history. For example, adjustments may be based on the driving history for multiple drivers.

In some implementations, responsiveness may be based on more than one challenge-response pair. For example, the past two, three, four, five, or more such pairs may be aggregated to determine a current level of responsiveness.

Vehicle control component 26 may be configured to operate vehicle 12 in one or more modes of operation. In some implementations, vehicle control component 26 may be configured to transition vehicle control between different modes of operation. For example, vehicle control component 26 may transition vehicle control from an autonomous mode of operation to a manual mode of operation, and/or vice versa. For example, vehicle control component 26 may transition vehicle control from an autonomous mode of operation to halt vehicle operation, e.g. by pulling vehicle 12 over or parking vehicle 12. In some implementations, operations and/or transitions by vehicle control component 26 may be based on determinations by responsiveness component 25, and/or based on the operation of other components. In some implementations, operations of autopilot component 21 may be based on the operations of the vehicle control component 26, and/or vice versa.

In some implementations, vehicle control component 26 may be configured to determine that vehicle control should be transitioned between different modes of operation. Determinations by vehicle control component 26 may be based on one or more considerations. For example, a determination to transition from an autonomous operation mode to a manual operation mode may be based on a set of considerations. In some implementations, considerations may include one or more of operator confidence, automation confidence, responsiveness, preparedness, traffic parameters, visibility, riskiness of the current driving parameters, system malfunction, and/or other considerations.

Figure 3:
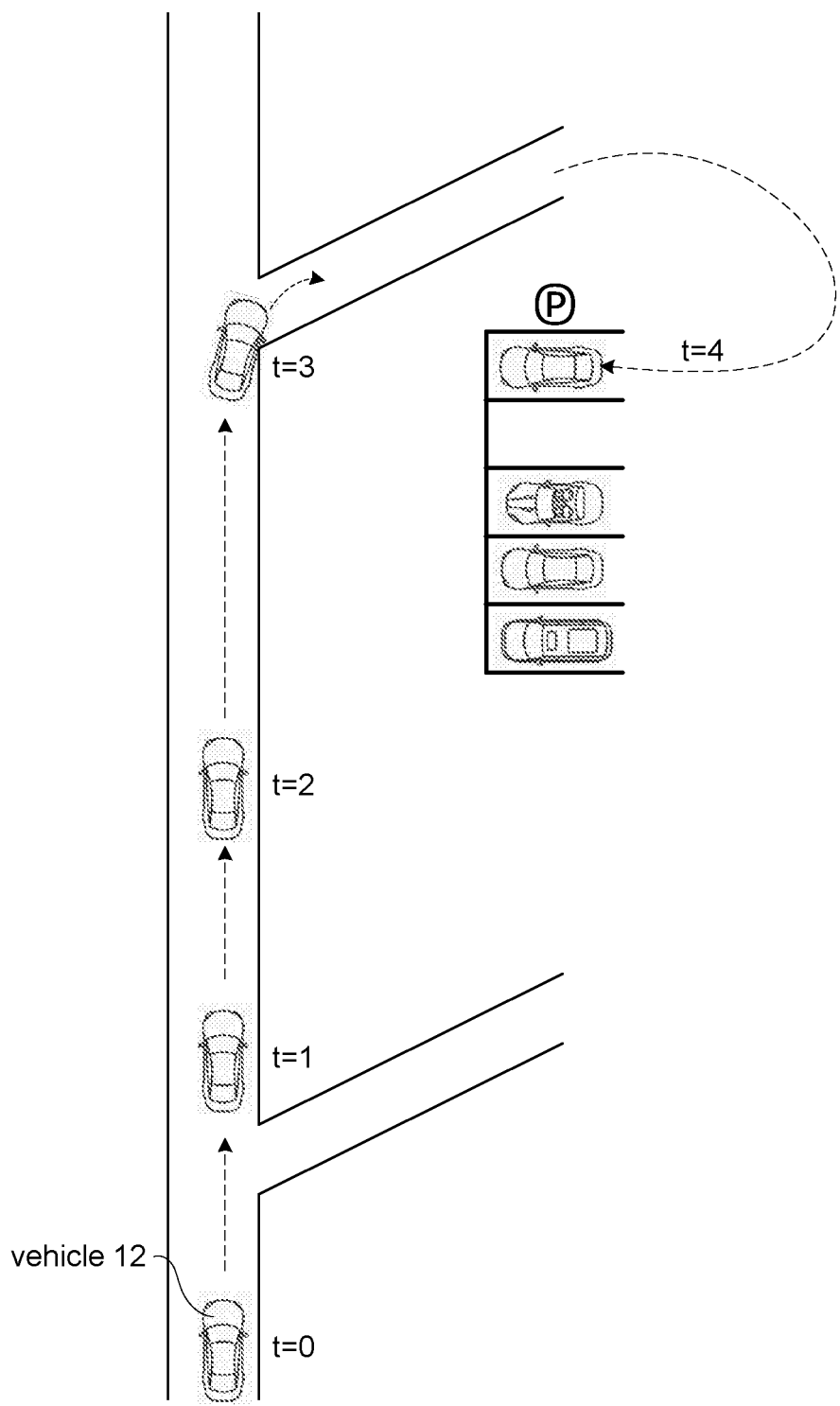
FIG. 3 illustrates a scenario in which a system configured to determine vehicle operator preparedness for vehicle operators of vehicles that support both autonomous operation and manual operation is used, in accordance with one or more embodiments.

By way of non-limiting example, FIG. 3 illustrates a top-view of a scenario in which a system similar or the same as system 10 of FIG. 1 is used. At a moment indicated by "t=0," vehicle 12 is driving on a road in an autonomous operation mode of control, in a direction indicated by a dotted arrow. At a subsequent moment indicated by "t=1," a system of vehicle 12 presents a challenge to the operator of vehicle 12 to gauge the level of responsiveness of the vehicle operator. At a subsequent moment indicated by "t=2," the system detects a response by the vehicle operator to the presented challenge. At a subsequent moment indicated by "t=3," the system determines that the level of responsiveness of the vehicle operator is not adequate to maintain the autonomous vehicle operation. As a result, vehicle 12 is guided to the nearest parking place. At a subsequent moment indicated by "t=4," the system parks vehicle 12 in a parking spot and halts autonomous operation of vehicle 12.

Confidence component 27 may be configured to determine levels of confidence pertaining to one or more modes of vehicle operation. In some implementations, confidence component 27 may be configured to determine a metric representing a level of operator confidence, also referred to as an operator confidence. Operator confidence may be a level of confidence that the vehicle operator is prepared to assume manual control of vehicle 12. In some implementations, operator confidence may be based on the level of responsiveness of the vehicle operator as determined by responsiveness component 25. In some implementations, operator confidence may be based on a prediction of how responsive a particular vehicle operator will be. Alternatively, and/or simultaneously, operator confidence may be based on a prediction of the level of responsiveness required to transition vehicle control to the vehicle operator. In some implementations, predictions may be based on traffic parameters, weather parameters, and/or other parameters. For example, driving at a higher speed may correspond to a requirement of a higher level of responsiveness, whereas driving at a lower speed may correspond to a requirement of a lower level of responsiveness.

In some implementations, confidence component 27 may be configured to determine an automation confidence. Automation confidence may be a level of confidence that vehicle control should continue autonomous vehicle operation. Automation confidence may be based on one or more predictions. For example, automation confidence may be based on a prediction of changes in a traffic parameter and/or other parameter. One or more levels of confidence may be used by other components, e.g. by timing component 22. In some implementations, lower levels of confidence may correspond to more and/or more frequent challenges to the vehicle operator.

Preparedness component 30 may be configured to determine preparedness of one or more vehicle operators. In some implementations, preparedness may indicate whether a vehicle operator is ready or prepared to assume control of vehicle 12. In some implementations, preparedness may indicate whether a vehicle operator is ready or prepared to assume control of vehicle 12 that is currently controlled autonomously and/or by another person. In some implementations, preparedness may be represented by a metric, a level, a numeric value, and/or other representation. In some implementations, preparedness may be determined per individual vehicle operator. In some implementations, preparedness may be based on a level of responsiveness, e.g. as determined by responsiveness component 25. In some implementations, preparedness may be determined based on at least two responses by an individual vehicle operator to presented challenges. In some implementations, preparedness may be determined based on at least three responses by an individual vehicle operator to presented challenges. In some implementations, preparedness may be determined based on more than three responses by an individual vehicle operator to presented challenges.

In some implementations, preparedness may be determined based on responses spanning a particular duration by an individual vehicle operator to presented challenges. For example, the particular duration may be an hour, two hours, four hours, six hours, eight hours, a day, two days, three days, four days, a week, and/or another duration as appropriate.

In some implementations, preparedness component 30 may be configured to determine changes in preparedness spanning a particular duration and/or a particular number of challenges. For example, preparedness component 30 may be configured to determine changes in preparedness spanning at least three challenges and responses, at least an entire day, and/or another appropriate amount. In some implementations, preparedness component 30 may be configured to modify a metric of preparedness, e.g. based on responsiveness. In some implementations, preparedness component 30 may be configured to modify a metric of preparedness, e.g. based on actual responsiveness related to a transition to a manual mode of operation.

Performance component 31 may be configured to determine driving performance of one or more vehicle operators. In some implementations, driving performance may include a duration during and/or after a transition between operation modes. For example, driving performance may include a duration during and/or after a transition from an autonomous operation mode to a manual operation mode. In some implementations, driving performance may be based on output signals generated by one or more sensors 142. By way of non-limiting example, occurrences of driving maneuvers may affect driving performance as determine by performance component 31. For example, speeding and/or hard braking (alone or in combination) may effectuate a lower driving performance score than adhering to the speed limit and moderate braking.

Comparison component 32 may be configured to compare preparedness of individual vehicle operators over time. For example, comparison component 32 may be configured to determine a trend in the preparedness of an individual vehicle operator, e.g. over a period of time spanning a day, a week, a month, and/or another period of time. In some implementations, comparison component 32 may be configured to compare preparedness between more than one vehicle operator. In some implementations, comparison component 32 may be configured to compare preparedness of a set of vehicle operators. For example, a set of vehicle operators may be selected and/or filtered on one or more characteristics they have in common, such as geographical location (of the vehicle operators and/or their vehicles), a demographic characteristic, and/or other information. For example, preparedness at a particular time-of-day may be compared among a set of vehicle operators. In some implementations, comparison component 32 may be configured to generate a report regarding preparedness of one or more vehicle operators. For example, reports may be transmitted by transmission component 29, e.g. to a system, server, and/or a service that is external to the one or more vehicles involved, including but not limited to a remote server and/or an external provider 18.

In some implementations, additional challenges may be presented to vehicle operators having one or more characteristics in common. In some implementations, responsiveness may be determined differently (e.g. by using different thresholds) for vehicle operators having one or more characteristics in common. In some implementations, preparedness may be determined differently for vehicle operators having one or more characteristics in common.

Figure 4:
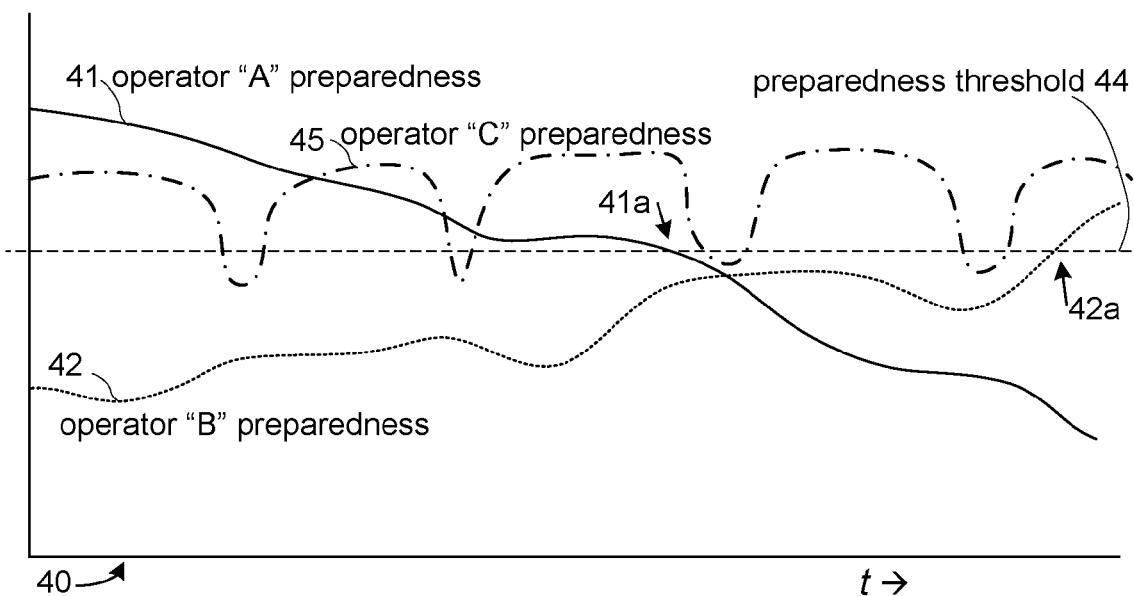
FIG. 4 illustrates various examples of scenarios in which a system configured to determine vehicle operator preparedness for vehicle operators of vehicles that support both autonomous operation and manual operation is used, in accordance with one or more embodiments.

By way of non-limiting example, FIG. 4 illustrates various examples of scenarios in which a system similar or the same as system 10 of FIG. 1 is used to determine vehicle operator preparedness. In graph 40, the horizontal axis represents the passage of time, and the vertical axis represents a metric or level of preparedness. In function 41, the preparedness of vehicle operator "A" is depicted. A preparedness threshold 44 is indicated by a horizontal line, even though such a threshold need not be fixed over time. For example, under certain conditions, preparedness threshold 44 may be increased or decreased, and/or otherwise modified. At a moment indicated by reference 41*a*, operator "A" preparedness breaches preparedness threshold 44. Depending on the scenario, the system may determine, responsive to occurrence of moment 41*a*, that vehicle operation should transition from an autonomous operation mode to stop, park, or pull over. Alternatively, and/or simultaneously, the system may determine that vehicle operator "A" should be presented with a challenge in an attempt to increase his or her preparedness.

In function 42, the preparedness of vehicle operator "B" is depicted. At a moment indicated by reference 42*a*, operator "B" preparedness breaches preparedness threshold 44. Depending on the scenario, the system may determine, responsive to occurrence of moment 42*a*, that vehicle operation should transition from a manual operation mode to an autonomous operation mode. Alternatively, and/or simultaneously, the system may determine that vehicle operator "B" should be presented with fewer challenges to gauge responsiveness.

In function 45, the preparedness of vehicle operator "C" is depicted. At various moments, operator "C" preparedness breaches preparedness threshold 44. Depending on the scenario, the system may determine, responsive to these breaches, that vehicle operation should transition from an autonomous operation mode to a manual operation mode, or vice versa. Alternatively, and/or simultaneously, the system may determine that vehicle operator "C" should be presented with additional challenges to gauge responsiveness. For example, the system may determine that breaches of preparedness threshold 44 occur in a pattern. For example, the pattern of operator "C" preparedness 45 may include daily, weekly, monthly, and/or other trends worth noting. For example, operator "C" may often appear to be less prepared to assume control of his or her vehicle at a particular time-of-day, in the weekend, in a particular week every month or most months, and/or at another reoccurring interval. In some implementations, the system may determine that a particular mode of vehicle operation may be not available during certain times, and/or that additional challenges to gauge responsiveness are warranted at such times.

Referring to FIG. 1, record component 28 may be configured to capture, record, store, transmit, and/or process information, including but not limited to information related to vehicle operation. In some implementations, information related to vehicle operation may be used to generate and/or create vehicle event records. Vehicle event records may include video information, audio information, data from an ECM system, metadata, timing information, information based on sensor-generated output, and/or other information. For example, changes in the operation mode of vehicle 12 may be used to create a vehicle event record. In particular, information regarding transitions from autonomous to manual operation may be captured, recorded, stored, transmitted, and/or otherwise processed. In some implementations, record component 28 may be configured to capture information conveyed by the output signals proximate in time to presentation of one or more particular challenges and/or responses.

Vehicle event records may be generated and/or stored locally in vehicle 12 and/or transmitted from vehicle 12 to system 10, server 11, and/or to a service that is external to the vehicle, including but not limited to a remote server and/or external provider 18. In some implementations, vehicle event records may be generated and/or stored remotely, i.e. not locally at vehicle 12. In some implementations, system 10, server 11, and/or a service that is external to vehicle 12 may query and/or request information from a particular vehicle 12. Record component 28 may be configured to respond to a query or request by transmitting information as queried and/or requested. In some implementations, record component 28 may be configured to facilitate communication of information between particular vehicles, remote servers, external providers, and/or other systems, servers, and/or services external to the particular vehicles. Such communication may be in real-time or near real-time. Such communication may include wireless communication.

Transmission component 29 may be configured to transmit information, e.g. to one or more remote servers that are external to vehicle 12. For example, transmission component 29 may be configured to transmit vehicle event records. Vehicle event records may be stored locally in vehicle 12 and/or transmitted from vehicle 12 to system 10, server 11, and/or a service that is external to vehicle 12, including but not limited to a remote server and/or an external provider 18. In some implementations, a system, server, and/or a service that is external to the vehicle may query and/or request information from vehicle 12. Transmission component 29 may be configured to respond to a query or request by transmitting information as queried and/or requested. In some implementations, transmission component 29 may be configured to facilitate communication of information between vehicles, remote servers, external providers, and/or other systems, servers, and/or services external to vehicles. Communication may be in real-time or near real-time. Communication may be wireless.

Transmission component 29 may be configured to generate and/or determine notifications related to vehicle operation. In some implementations, notifications may be intended for drivers of vehicles. For example, transmission component 29 may be configured to receive transmission, such as notifications for drivers, including but not limited to warnings or requests (for example to reduce speed). In some implementations, notifications may be transmitted from vehicle 12 to a system, server, and/or a service that is external to the vehicle, including but not limited to a remote server and/or an external provider 18.

In some implementations, system 10 may include a user interface configured to provide an interface between system 10 and users through which the users may provide information to and receive information from system 10. This enables information to be communicated between a user and one or more of processor 110, sensors 142, vehicle 12, and/or other components of system 10.

Examples of interface devices suitable for inclusion in a user interface include a keypad, buttons, switches, a keyboard, knobs, levers, a display screen, a touch screen, speakers, a microphone, an indicator light, an audible alarm, a printer, a tactile feedback device, and/or other interface devices.

It is to be understood that other communication techniques, either hard-wired or wireless, are also contemplated by the present disclosure as a user interface. Information may be loaded into system 10 wirelessly from a remote location, from removable storage (e.g., a smart card, a flash drive, a removable disk, etc.), and/or other sources that enable the user(s) to customize the implementation of system 10. Other exemplary input devices and techniques adapted for use with system 10 include, but are not limited to, an RS-232 port, RF link, an IR link, modem (telephone, cable, and/or other modems), a cellular network, a Wi-Fi network, a local area network, and/or other devices and/or systems. In short, any technique for communicating information with system 10 is contemplated by the present disclosure as a user interface.

Electronic storage 60 may comprise electronic storage media that electronically stores information. The electronic storage media of electronic storage 60 may comprise one or both of system storage that is provided integrally (i.e., substantially non-removable) with system 10 and/or removable storage that is removably connectable to system 10 via, for example, a port (e.g., a USB port, a firewire port, etc.) or a drive (e.g., a disk drive, etc.). Electronic storage 60 may comprise one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 60 may store software algorithms, recorded video event data, information determined by processor 110, information received via a user interface, and/or other information that enables system 10 to function properly. Electronic storage 60 may be (in whole or in part) a separate component within system 10, or electronic storage 60 may be provided (in whole or in part) integrally with one or more other components of system 10.

In some implementations, a remote server may include communication lines, or ports to enable the exchange of information with a network, processor 110 of system 10, and/or other computing platforms. The remote server may include a plurality of processors, electronic storage, hardware, software, and/or firmware components operating together to provide the functionality attributed herein to a remote device. For example, the server may be implemented by a cloud of computing platforms operating together as a system server.

As described above, processor 110 may be configured to provide information-processing capabilities in system 10. As such, processor 110 may comprise one or more of a digital processor, an analog processor, a digital circuit designed to process information, an analog circuit designed to process information, a state machine, and/or other mechanisms for electronically processing information. Although processor 110 is shown in FIG. 1 as a single entity, this is for illustrative purposes only. In some implementations, processor 110 may comprise a plurality of processing units. These processing units may be physically located within the same device (e.g., a vehicle event recorder), or processor 110 may represent processing functionality of a plurality of devices operating in coordination.

Processor 110 may be configured to execute components 20-32 by software; hardware; firmware; some combination of software, hardware, and/or firmware; and/or other mechanisms for configuring processing capabilities on processor 110. It should be appreciated that although components 20-32 are illustrated in FIG. 1 as being co-located within a single processing unit, in implementations in which processor 110 comprises multiple processing units, one or more of components 20-32 may be located remotely from the other components. The description of the functionality provided by the different components 20-32 described herein is for illustrative purposes, and is not intended to be limiting, as any of components 20-32 may provide more or less functionality than is described. For example, one or more of components 20-32 may be eliminated, and some or all of its functionality may be provided by other components 20-32. As another example, processor 110 may be configured to execute one or more additional components that may perform some or all of the functionality attributed below to one of components 20-32.

Figure 2:
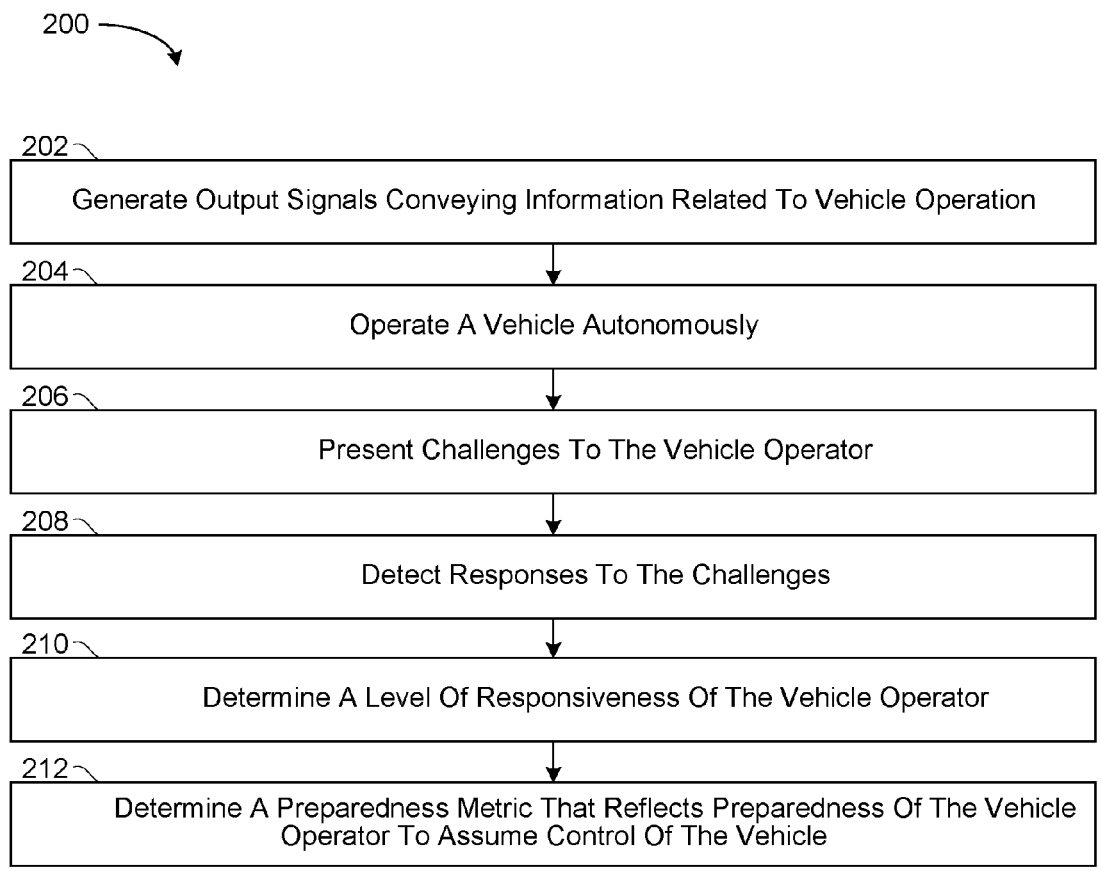
FIG. 2 illustrates a method to determine vehicle operator preparedness for vehicle operators of vehicles that support both autonomous operation and manual operation, in accordance with one or more embodiments.

FIG. 2 illustrates a method 200 to determine vehicle operator preparedness for vehicles that support both autonomous operation and manual operation. The operations of method 200 presented below are intended to be illustrative. In some implementations, method 200 may be accomplished with one or more additional operations not described, and/or without one or more of the operations discussed. Additionally, the order in which the operations of method 200 are illustrated (in FIG. 2) and described below is not intended to be limiting. In some implementations, two or more of the operations may occur substantially simultaneously.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on one or more electronic storage mediums. The one or more processing devices may include one or more devices configured through hardware, firmware, and/or software to be specifically designed for execution of one or more of the operations of method 200.

Referring to FIG. 2 and method 200, at an operation 202, output signals are generated by a set of sensors conveying information related to vehicle operation. In some embodiments, operation 202 is performed by a set of sensors the same as or similar to sensors 142 (shown in FIG. 1 and described herein).

At an operation 204, the vehicle is operated autonomously in an autonomous operation mode. In some embodiments, operation 204 is performed by an autopilot component the same as or similar to autopilot component 21 (shown in FIG. 1 and described herein).

At an operation 206, challenges are presented to the vehicle operator to gauge a level of responsiveness of the vehicle operator. In some embodiments, operation 206 is performed by a challenge component the same as or similar to challenge component 23 (shown in FIG. 1 and described herein).

At an operation 208, responses by the vehicle operator to the presented challenges are detected. In some embodiments, operation 208 is performed by a response component the same as or similar to response component 24 (shown in FIG. 1 and described herein).

At an operation 210, the level of responsiveness of the vehicle operator is determined based on detections of the responses. In some embodiments, operation 210 is performed by a responsiveness component the same as or similar to responsiveness component 25 (shown in FIG. 1 and described herein).

At an operation 212, a preparedness metric is determined that reflects preparedness of the vehicle operator to assume control of the vehicle. The preparedness metric is based on the level of responsiveness such that the preparedness metric spans at least two responses. In some embodiments, operation 212 is performed by a preparedness component the same as or similar to preparedness component 30 (shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system configured to determine vehicle operator preparedness for vehicle operators of vehicles that support both autonomous operation and manual operation, the system configured to couple with one or more vehicles, wherein the vehicles include a first vehicle and a second vehicle, wherein the operators include a first vehicle operator and a second vehicle operator, wherein the first vehicle is associated with the first vehicle operator, wherein the second vehicle is associated with the second vehicle operator, the system comprising:

a set of sensors configured to generate output signals conveying information related to vehicle operation of the first vehicle; and one or more processors configured to:
operate the first vehicle autonomously based on the generated output signals;
present challenges to the first vehicle operator to gauge a level of responsiveness of the first vehicle operator;
present a second set of challenges to the second vehicle operator to gauge a second level of responsiveness of the second vehicle operator;
detect responses by the first vehicle operator to the challenges, wherein individual ones of the responses correspond to individual ones of the challenges;
detect a second set of responses by the second vehicle operator to the second set of challenges;
determine the level of responsiveness of the first vehicle operator based on detections of the responses;
determine the second level of responsiveness of the second vehicle operator based on the second set of detections of responses;
determine a preparedness metric that reflects preparedness of the first vehicle operator to assume control of the first vehicle, wherein the preparedness metric is based on the level of responsiveness such that the preparedness metric spans at least two responses; and determine a second preparedness metric that reflects preparedness of the second vehicle operator to assume control of the second vehicle, wherein the second preparedness metric is based on the second level of responsiveness.

2. The system of claim 1, wherein the one or more processors are further configured to:
determine a change in the preparedness metric over a period of time spanning at least three detections of responses.

3. The system of claim 1, wherein the one or more processors are further configured to:
determine a change in the preparedness metric over a period of time spanning more than one day.

4. The system of claim 1, wherein the output signals convey one or more of biometric information of the first vehicle operator, operator information related to a direction of view of the first vehicle operator, traffic information related to current traffic parameters, and environmental information related to surface parameters of the road, and wherein the preparedness metric is further based on the output signals.

5. The system of claim 1, wherein the one or more processors are further configured to:
determine that vehicle control shall be transitioned from autonomous operation to manual operation by the first vehicle operator, wherein the determination to transition vehicle control is based on a set of considerations;
transition vehicle control from autonomous operation to manual operation by the first vehicle operator;
determine a level of actual responsiveness of the first vehicle operator during the transition; and
modify the preparedness metric based on the determined level of actual responsiveness.

6. The system of claim 5, wherein the preparedness metric is further based on the set of considerations that prompted the determination to transition vehicle control.

7. The system of claim 1, wherein the one or more processors are further configured to:
determine that vehicle control shall be transitioned from autonomous operation to manual operation by the first vehicle operator, wherein the determination to transition vehicle control is based on a set of considerations;
transition vehicle control from autonomous operation to manual operation by the first vehicle operator;
determine driving performance of the first vehicle operator during and/or after the transition, wherein the driving performance is based on the output signals; and
modify the preparedness metric based on the determined driving performance.

8. The system of claim 1, wherein the one or more processors are configured to determine the preparedness metric by a remote server that is external to the first vehicle.

9. The system of claim 1, wherein the one or more processors are further configured to:
compare the preparedness metric with the second preparedness metric.

10. A method to determine vehicle operator preparedness for vehicle operators of vehicles that support both autonomous operation and manual operation, wherein the vehicles include a first vehicle and a second vehicle, wherein the operators include a first vehicle operator and a second vehicle operator, wherein the first vehicle is associated with the first vehicle operator, wherein the second vehicle is associated with the second vehicle operator, the method comprising:
generating, by a set of sensors, output signals conveying information related to vehicle operation of the first vehicle;
operating the first vehicle autonomously based on the generated output signals;
presenting challenges to the first vehicle operator to gauge a level of responsiveness of the first vehicle operator;
presenting a second set of challenges to the second vehicle operator to gauge a second level of responsiveness of the second vehicle operator;
detecting responses by the first vehicle operator to the challenges, wherein individual ones of the responses correspond to individual ones of the challenges;
detecting a second set of responses by the second vehicle operator to the second set of challenges;
determining the level of responsiveness of the first vehicle operator based on detections of the responses;
determining the second level of responsiveness of the second vehicle operator based on the second set of detections of responses;
determining a preparedness metric that reflects preparedness of the first vehicle operator to assume control of the first vehicle, wherein the preparedness metric is based on the level of responsiveness such that the preparedness metric spans at least two responses; and
determining a second preparedness metric that reflects preparedness of the second vehicle operator to assume control of the second vehicle, wherein the second preparedness metric is based on the second level of responsiveness.

11. The method of claim 10, further comprising:
determining a change in the preparedness metric over a period of time spanning at least three detections of responses.

12. The method of claim 10, further comprising:
determine a change in the preparedness metric over a period of time spanning more than one day.

13. The method of claim 10, wherein the output signals convey one or more of biometric information of the first vehicle operator, operator information related to a direction of view of the first vehicle operator, traffic information related to current traffic parameters, and environmental information related to surface parameters of the road, and wherein the preparedness metric is further based on the output signals.

14. The method of claim 10, further comprising:
determining that vehicle control shall be transitioned from autonomous operation to manual operation by the first vehicle operator, wherein the determination to transition vehicle control is based on a set of considerations;
transitioning vehicle control from autonomous operation to manual operation by the first vehicle operator;
determining a level of actual responsiveness of the first vehicle operator during the transition; and
modifying the preparedness metric based on the determined level of actual responsiveness.

15. The method of claim 14, wherein the preparedness metric is further based on the set of considerations that prompted the determination to transition vehicle control.

16. The method of claim 10, further comprising:
determining that vehicle control shall be transitioned from autonomous operation to manual operation by the first vehicle operator, wherein the determination to transition vehicle control is based on a set of considerations;

transitioning vehicle control from autonomous operation to manual operation by the first vehicle operator;

determining driving performance of the first vehicle operator during and/or after the transition, wherein the driving performance is based on the output signals; and modifying the preparedness metric based on the determined driving performance.

17. The method of claim 10, wherein determining the preparedness metric is performed by a remote server that is external to the first vehicle.

18. The method of claim 10, further comprising:

comparing the preparedness metric with the second preparedness metric.

* * * * *